United States Patent
Stark et al.

(10) Patent No.: US 8,082,052 B2
(45) Date of Patent: Dec. 20, 2011

(54) METHOD AND APPARATUS FOR ENSURING THE DIMENSIONAL CONSTANCY OF MULTISEGMENT PHYSICAL STRUCTURES DURING ASSEMBLY

(75) Inventors: Ulrich Stark, Stade (DE); Jorg Schrickel, Deinste (DE); Oliver Kraatz, Weyhe (DE); Dirk Gross, Stade (DE)

(73) Assignee: Airbus Deutschland GmbH, Hamburg (DE)

( * ) Notice: Subject to any disclaimer, the term of this patent is extended or adjusted under 35 U.S.C. 154(b) by 188 days.

(21) Appl. No.: 12/225,507

(22) PCT Filed: Apr. 27, 2007

(86) PCT No.: PCT/EP2007/054152
§ 371 (c)(1),
(2), (4) Date: Sep. 22, 2009

(87) PCT Pub. No.: WO2007/125097
PCT Pub. Date: Nov. 8, 2007

(65) Prior Publication Data
US 2010/0049354 A1 Feb. 25, 2010

(30) Foreign Application Priority Data
Apr. 28, 2006 (DE) .......................... 10 2006 019 917

(51) Int. Cl.
*G06F 19/00* (2011.01)
*B64C 1/00* (2006.01)
*B64C 30/00* (2006.01)
*H01R 43/00* (2006.01)

(52) U.S. Cl. ................. 700/98; 700/95; 700/96; 700/97; 244/117 R; 29/33 R; 29/876; 29/895.2

(58) Field of Classification Search ............. 700/95–98; 244/117 R, 123.2, 123.3; 29/33 R, 428, 469, 29/876, 895.2
See application file for complete search history.

(56) References Cited

U.S. PATENT DOCUMENTS
5,870,136 A * 2/1999 Fuchs et al. ..................... 348/42
(Continued)

FOREIGN PATENT DOCUMENTS
DE 292520 A5 8/1991
(Continued)

OTHER PUBLICATIONS
German Office Action for DE 10 2006 019 917 dated Feb. 5, 2007.
(Continued)

*Primary Examiner* — Ramesh Patel
(74) *Attorney, Agent, or Firm* — Jenkins, Wilson, Taylor & Hunt, P.A.

(57) ABSTRACT

Methods and apparatuses for ensuring the dimensional constancy of multisegment physical structures, in particular aircraft structures, during assembly are disclosed. The method includes setting up a spatially-fixed three-dimensional coordinate system which encloses the subsequent assembled physical structure and introducing a plurality of segments of the physical structure to be assembled into the spatially-fixed three-dimensional coordinate system. The method includes recording the positions of the individual segments and the positions of already assembled groups of segments repeatedly within the spatially-fixed three-dimensional coordinate system during assembly. The method includes correcting the position of a respective segment or of a respective already assembled group of segments if a respective record shows that the positions of the respective segment or of the respective already assembled group of segments is outside a tolerance band, which is predetermined in accordance with a desired dimensional constancy, by a respective predetermined nominal value.

10 Claims, 2 Drawing Sheets

U.S. PATENT DOCUMENTS

| | | | |
|---|---|---|---|
| 6,570,568 B1 * | 5/2003 | Horn et al. | 345/428 |
| 6,681,145 B1 * | 1/2004 | Greenwood et al. | 700/193 |
| 6,912,293 B1 * | 6/2005 | Korobkin | 382/100 |
| 7,176,407 B2 * | 2/2007 | Hunter et al. | 219/121.7 |
| 7,342,738 B1 * | 3/2008 | Anderson et al. | 360/77.12 |
| 2002/0091441 A1 * | 7/2002 | Guzik | 623/2.13 |
| 2003/0208302 A1 | 11/2003 | Lemelson et al. | |
| 2005/0089213 A1 * | 4/2005 | Geng | 382/154 |
| 2005/0091576 A1 * | 4/2005 | Relyea et al. | 715/502 |
| 2006/0061354 A1 * | 3/2006 | Wallance et al. | 324/207.15 |
| 2007/0017081 A1 | 1/2007 | Becker et al. | |
| 2008/0012851 A1 * | 1/2008 | Bae et al. | 345/419 |
| 2008/0111985 A1 * | 5/2008 | Bridges | 356/3.16 |
| 2010/0161095 A1 * | 6/2010 | Lindgren | 700/98 |

FOREIGN PATENT DOCUMENTS

| | | |
|---|---|---|
| DE | 19931676 A1 | 1/2001 |
| DE | 1345099 A2 | 9/2003 |
| DE | 10235905 A1 | 9/2003 |
| DE | 10242710 A1 | 4/2004 |
| JP | 09013894 | 1/1997 |
| JP | 2003039347 | 2/2003 |

OTHER PUBLICATIONS

German Office Action for DE 10 2006 019 917 dated May 29, 2009.
International Search Report for PCT/EP/2007/054152 dated Oct. 4, 2007.

* cited by examiner ural control of the production installation. In this refinement, no additional measurement points on the segments or segment groups are required for the method according to the invention, but the positions of all the measurement points can advantageously be used as geometric data.

METHOD AND APPARATUS FOR ENSURING THE DIMENSIONAL CONSTANCY OF MULTISEGMENT PHYSICAL STRUCTURES DURING ASSEMBLY

FIELD OF THE INVENTION

The present invention relates to a method and an apparatus for ensuring the dimensional constancy of multisegment physical structures during assembly.

BACKGROUND OF THE INVENTION

Without any restriction to their general applicability, the present invention as well as the problems on which it is based will be explained with reference to the assembly of multisegment aircraft structures.

Production installations that are used at present for aircraft fuselage manufacture have geometry-defining elements from whose use the final external skin geometry is produced. These geometry-defining elements are normally composed of steel and are manufactured such that the internal streamline shape of the fuselage shells can be fixed to them such that the resultant position of the external streamline shape corresponds to the nominal contour. In this case, it is necessary to ensure that the geometry-defining elements change only within an order of magnitude which is within the acceptable tolerance band throughout the time period of their use, in particular throughout the time period of manufacture of a respective aircraft fuselage.

More modern manufacturing installation technology is already dispensing with these geometry-defining elements and is making use of numerically-controlled (NC) positioning axes for this purpose. In this case, the geometry is achieved by correct positioning of the individual fuselage segments with respect to one another. In this production technique, as in the production technique described above, the process result is checked at the end of the overall process. This is necessary because the production environment does not remain stable throughout the entire process time, for example owing to temperature fluctuations, geological, partial lowering and raising of the production workshops, and the like.

One disadvantage that is being found with the production techniques described above is the fact that, in certain circumstances, it is found as the result of the measurement at the end of the overall process that a discrepancy is present which cannot be tolerated. This circumstance that the discrepancy which cannot be tolerated occurs in a separate process step after completion of all the value-creation stages that have already been carried out, makes these manufacturing concepts financially expensive and unattractive.

SUMMARY OF THE INVENTION

One object of the present invention is therefore to provide an improved method and an improved apparatus for ensuring the dimensional constancy of multisegment physical structures during assembly, which allow monitoring and if necessary correction of the dimensional constancy at any time in the production process, preferably even continuously.

The expression aircraft structure covers, for example, the aircraft fuselage and/or sections of the aircraft fuselage, main planes or sections of the main planes, as well as stabilizers or parts of the stabilizers.

For example, the spatially-fixed coordinate system may be formed based on a fix point within the manufacturing workshops or based on a fix point outside the manufacturing workshops, for example based on one or more satellites.

By way of example, if the dimensional constancy is found to be non-compliant with that required, one suitable way to correct this is to align two segments of the physical structure which are to be assembled with one another relative to one another once again before they are firmly connected to one another. This correction of the position of a respective segment or of a respective already assembled group of segments is also provided such that the dimensional constancy is within a predetermined tolerance band. In other words, the method according to the invention and the apparatus according to the invention also allow certain, preferably freely predeterminable, tolerances in precisely the same way as any other measurement and/or inspection method.

Fundamentally, the following two procedures can be adopted in order to monitor the positions within the spatially-fixed three-dimensional coordinate system:

a) The relative position of the segments or segment groups with respect to one another is monitored within the spatially-fixed coordinate system, and the segments or segment groups are aligned relative to one another on the basis of the recorded positions. The spatial position of the completely assembled physical structure within the spatially-fixed coordinate system is in this case of secondary importance.

b) The absolute position of the individual segments or segment groups within the spatially-fixed coordinate system is monitored and the segments are aligned on the basis of predeterminable nominal positions within the spatially-fixed coordinate system. In this case, the spatial position of the complete physical structure within the spatially-fixed coordinate system is of major importance.

The method according to the invention, as well as the corresponding apparatus, have the advantage over the prior art that the result of the assembly of the physical structure can be predicted and/or corrected at any time during the assembly process. The repeated, preferably continuous, recording of the positions of the individual segments or segment groups throughout the entire time period of assembly of the physical structure makes it possible, when using geometry-defining elements, to preclude any discrepancies from the desired dimensional constancy using rejection procedures, so that the desired dimensional constancy exists at the end of the assembly process, and the physical structure can be processed further immediately.

When using numerically controlled positioning devices, the geometric data determined during the assembly process can be processed immediately and can be used as a controlled variable, so that no discrepancies exist from the desired dimensional constancy at the end of an ideal assembly process.

One preferred refinement of the invention provides that, for non-contacting recording of the positions of the individual segments or segment groups, measurement points remain permanently arranged on the individual segments or segment groups through the assembly of the physical structure, with the positions of the measurement points being recorded within the spatially-fixed coordinate system and/or the relative position with respect to measurement points associated with different segments being recorded. Any position correction which may be required is carried out by variation of the positions of the measurement points within the spatially-fixed coordinate system and/or by variation of the relative position of measurement points associated with different segments. By way of example, the measurement points may comprise the measurement points which are normally used for numerically controlled positioning devices, for example coloured markings on the individual segments. The measurement points preferably comprise auxiliary apparatuses which are arranged at the segments or segment groups and which, for example, are able to determine satellite-based position data, and to pass this position data to a central control apparatus.

A further preferred refinement of the invention provides that the spatially-fixed coordinate system is formed by a main transmitter and a plurality of secondary transmitters, with the positions of the secondary transmitters with respect to the main transmitter being monitored continuously, and with the measured values from the secondary transmitters being corrected in the event of any discrepancy from the preset nominal values of the position values from the secondary transmitters. By way of example, the main transmitter may be a sensor for non-contacting recording of the position of one or more segments within the spatially-fixed coordinate system, whose position within the manufacturing workshops is either known, or whose position is used a priori as the origin or fix point within the spatially-fixed coordinate system. In this case, the secondary transmitters may be further additional sensors, which preferably have a direct or indirect visual link with the main transmitter and, for example, record the positions of segments which are located on the side of the physical structure facing away from the main transmitter. It is likewise feasible for the spatially-fixed coordinate system to be formed by means of satellite-assisted position data. In this case, the respective satellites which are above the horizon for position finding are used as secondary transmitters, in which case, for example, a ground station whose location is known acts as the main transmitter, in order to correct delay-time errors and/or fuzziness in the satellite-protected position data.

A further preferred refinement of the invention provides for the positions of the individual segments and/or of the measurement points which are arranged on the individual segments to be recorded by the transmitters in the spatially-fixed coordinate system without contact being made. In this case, provision is made for the transmitters in the spatially-fixed coordinate system to comprise, for example, sensors for non-contacting recording of the positions of the individual segments, with the position of a main transmitter, for example, being used as the origin of the spatially-fixed coordinate system, and with the main transmitter being used primarily to monitor the positions of the secondary transmitters, in order to correct the measured value of the sensors which are used as secondary transmitters, in the event of any discrepancies from their nominal positions.

A further preferred refinement of the invention provides for the positions of the individual segments and/or of the measurement points which are arranged on the individual segments to be monitored by auxiliary tools, with the positions of the auxiliary tools within the spatially-fixed coordinate system being continuously monitored by the transmitters in the spatially-fixed coordinate system. Auxiliary tools which can be used for this purpose may, for example, be the numerically controlled positioning devices that are used, whose respective position within the manufacturing workshops is known and/or is monitored within the spatially-fixed coordinate system. If a discrepancy is found between the position of an auxiliary tool and its nominal position, there are two preferred options which should be considered:

a) by renewed positioning of the auxiliary tool at its nominal position;
b) by calculation of the discrepancy between the position of the auxiliary tool and its nominal position and calculation of a correction factor, which takes account of this discrepancy, for the position data recorded by this auxiliary tool and/or the control data for this auxiliary tool.

If the spatially-fixed coordinate system is formed by satellite-protected coordinate data, it is feasible for the auxiliary tools to comprise sensors for non-contacting recording of the positions of the segments and/or sensors for recording of at least the external contour of the segment groups which have already been assembled to form a part of the physical structure, with these sensors being provided with means for determination of their position within the spatially-fixed coordinate system. This position data can then be used, for example, to correct the measured values of the individual sensors.

A further preferred refinement of the invention provides for the spatially-fixed coordinate system to be formed by satellite-assisted position data, for example by Galileo or GPS (Global Positioning System). This is particularly advantageous when the spatially-fixed coordinate system is used in conjunction with maintenance work on aircraft in the open air.

A further preferred refinement of the invention provides for the spatially-fixed coordinate system to be formed by laser-assisted position data. For example, it is feasible for the spatially fixed coordinate system to be formed by a plurality of laser beams in the form of a fan, so-called laser fans, which are transmitted by the individual transmitters in the spatially-fixed coordinate system. The laser fans of all of the transmitters form a multiplicity of intersections, corresponding to coordinates within the spatially-fixed coordinate system. The positions of the individual segments of the segment groups which have already been assembled and/or the measurement points can be monitored either by optical recording of the laser coordinates or by reflection on the segments or the measurement points, or, for example, by laser-sensitive receivers arranged at the measurement points. A laser-assisted coordinate system is likewise feasible, in which the coordinates of the measurement points are determined by delay-time measurements based on the respective transmitters.

A further preferred refinement of the invention provides for the relative position of the segments or segment groups which governs the dimensional constancy of the physical structure to be recorded with respect to one another primarily in the spatially-fixed coordinate system. It is therefore in principle feasible to introduce a further coordinate system which originates from the absolute position of a first segment within the spatially-fixed coordinate system and can change its position with the segment within the spatially-fixed coordinate system during the assembly process, so that the coordinates of the individual segments within the further coordinate system remain unchanged in the event of a change to the position of the first segment within the spatially-fixed coordinate system. In this case, the relationship between the coordinates of the individual segments with one another remains unchanged within this further coordinate system.

A further preferred refinement of the invention provides for the absolute position of the segments or segment groups, which governs the dimensional constancy of the physical structure, within the spatially-fixed coordinate system to be recorded primarily in the spatially-fixed coordinate system. A further preferred refinement of the invention provides for non-contacting recording of the at least one part of the external contour, which reflects the external streamline shape, of the already assembled and/or positioned segments or segment groups, preferably as well as the segments or segment groups to be added in the respective work step, in addition to or instead of recording of the positions of the individual segments or segment groups within the spatially-fixed coordinate system, for continuous monitoring of the dimensional constancy of the physical structure.

BRIEF DESCRIPTION OF THE DRAWINGS

Exemplary embodiments of the invention will be explained in more detail in the following description and are illustrated in the drawings, in which.

DETAILED DESCRIPTION OF THE INVENTION

In a preparatory method step, which is not illustrated, a spatially-fixed three-dimensional coordinate system is set up in the area in which a physical structure in the form of an aircraft structure is intended to be assembled subsequently from a plurality of individual segments, so that the spatially-fixed three-dimensional coordinate system encloses the complete aircraft structure.

In a second preparatory method step, which is likewise not illustrated, measurement points (also referred to as targets) are permanently applied to the individual segments for continuous non-contacting recording of the positions of the individual segments within the spatially-fixed three-dimensional coordinate system that has been set up.

Figure 1:
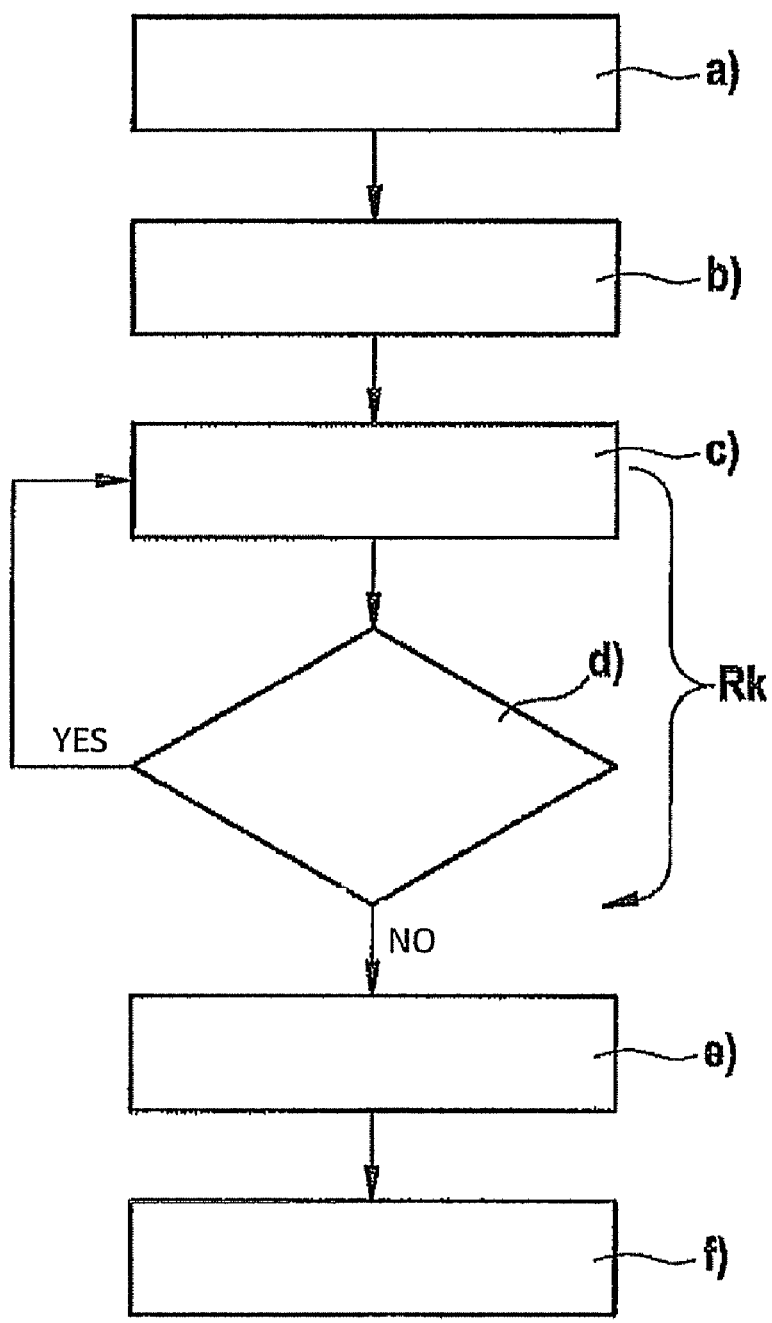
FIG. 1 shows a flowchart in order to illustrate the procedure according to one embodiment of the method according to the invention.

The main method as illustrated in FIG. 1 is carried out after completion of the two preparatory method steps.

In a first main method step a) the segments provided with the targets are clocked in or registered, that is to say the position of the targets on the individual segments, the nature of the segments and the position of the segments within the aircraft structure to be assembled are determined.

In a second main method step b) a first segment enters the recorded area of transmitters which form the spatially-fixed three-dimensional coordinate system. The position as well as the orientation of the first segment within the spatially-fixed coordinate system is in this case determined, and/or is set in accordance with preset values. A recording of the position and of the orientation of the first segment may be carried out, for example, optically by means of cameras and suitable image processing algorithms. However, it is also feasible to use only the target in order to determine, for example, position data for the individual targets within the spatially-fixed coordinate system in a similar manner to a satellite-assisted navigation system, such as GPS. The knowledge gained during the clocking-in and registration process in step a), about the nature, the use and the dimensions of the respective segment and, if appropriate any identification used for the targets, is used to determine the nominal position of the respective segment within the spatially-fixed coordinate system, and to determine any discrepancy from this.

In a third main method step c), numerically controlled positioning devices which support the first segment move the first segment to the exact nominal position corresponding to its subsequent arrangement within the overall aircraft structure.

A fourth main method step d) provides for continuous checking, throughout the entire assembly process, of this position, which may vary for example as a result of temperature influences.

In other words, in the main method step d), the position and orientation of the first segment within the spatially-fixed three-dimensional coordinate system are recorded repeatedly and cyclically throughout the entire assembly process.

In this case, the third and fourth main method steps c) and d), respectively, form a control loop RK and, if a change is found in the position, for example because of temperature influences, the first segment is once again moved to its exact nominal position.

If the actual position of the first segment matches its nominal position, then the first segment is stabilized in a fifth main method step e).

In a sixth main method step f), the match between the nominal position and the actual position is recorded, and is kept for quality control purposes.

The already described main method steps a) to f) are carried out successively for each individual segment and are then repeated cyclically until all of the segments which form the overall aircraft structure have been installed, and the aircraft structure has been completely assembled.

By way of example, according to this embodiment, the method can advantageously be used for assembly of large-format aircraft structures. In principle, the method can also be used when a high-precision, accurate wing process is intended to be carried out on relatively small parts of aircraft structures or other structures, and which may extend over a lengthy time period of several hours or several days.

The basis for carrying out the method successively and for achieving the advantages associated with the method is the implementation of sufficiently precise three-dimensional metrology in the manufacturing process, so that the measurement points which are relevant for quality assessment can be monitored at any time, and every measurement point is permanently available as a three-dimensional coordinate value.

The following variants are feasible for on-line monitoring such as this:

a) monitoring of points which are located in the vicinity of the actual process environment and formation of a corresponding correlation between a change in the monitored points and the changes found in the aircraft fuselage geometry;

b) direct permanent geometric measurement of the relevant aircraft fuselage coordinates, and corresponding calculation of a correction value for any changes found, with this being passed as a control command to the numerically controlled positioning devices.

The method ensures that the dimensional constancy of the assembled aircraft structure can be maintained at all times throughout the assembly of the aircraft structure from the plurality of segments, with this being known as the final result of the assembly process. Furthermore, the use of the method immediately after the assembly process allows further processing of the aircraft fuselage since the quality control and the checking of the dimensional constancy have already been carried out and recorded continuously during the assembly process. In addition, the method reduces the reworking costs and waste considerably, since the entire assembly process is continuously checked, and if necessary is corrected, for dimensional constancy of the complete aircraft structure.

Figure 2:
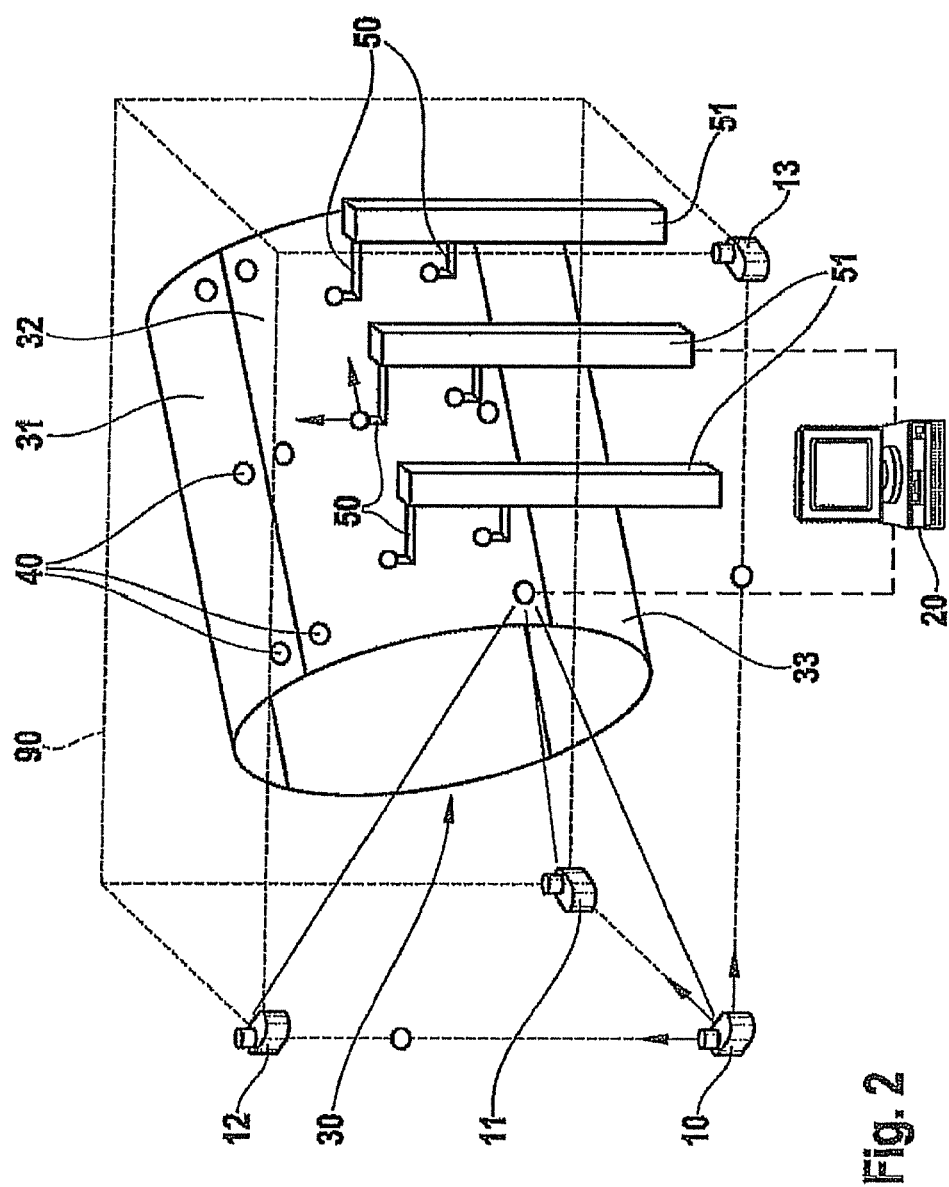
FIG. 2 shows a schematic illustration of an apparatus for carrying out the embodiment of the method according to the invention as shown in FIG. 1.

FIG. 2 shows a schematic illustration of an apparatus for carrying out the embodiment of the method according to the invention as shown in FIG. 1.

A spatially-fixed coordinate system 90 which encloses an aircraft structure 30 to be assembled from a plurality of segments 31, 32, 33 is formed by a main transmitter 10 and a plurality of secondary transmitters 11, 12, 13. The secondary transmitters 11, 12, 13 all have a direct visual link with the main transmitter 10, which continuously monitors the position of the secondary transmitters 11, 12, 13 in order to signal any position shifts which may possibly occur of the secondary transmitters to a central computation unit 20. The positions of secondary transmitters arranged behind the aircraft structure 30 may be monitored, for example, via indirect visual links by coupling via the secondary transmitters 11, 12, 13 which have a direct visual link.

The aircraft structure 30 is assembled from the plurality of segments 31, 32, 33. In order to allow the position and orientation of the individual segments 31, 32, 33 within the spatially-fixed coordinate system 90 to be recorded, targets 40 are arranged on the segments 31, 32, 33 and can be recorded by the transmitters 10, 11, 12, 13 without contact being made. The positions of the targets 40 can be determined within the spatially-fixed coordinate system 90 by interference or delay-time measurement, for example using laser beams, from the plurality of transmitters 10, 11, 12, 13. Once the association between the targets 40 and the individual segments 31, 32, 33 is known, for example on the basis of correlation of the joint movement of the targets 40 with one another when a respective segment 31, 32, 33 is being introduced into the spatially-fixed coordinate system 90 and the recording area of the transmitters 10, 11, 12, 13 or by the clocking-in or registration of the segments 31, 32, 33, the positions of the segments 31, 32, 33 within the spatially-fixed coordinate system can be calculated by means of the central computation unit on the basis of the positions of the targets 40.

The individual segments 31, 32, 33 are moved to their nominal positions and nominal orientations by means of numerically controlled positioning devices 50 which are arranged on adjustable construction apparatuses 51. The central computation unit 20 in this case controls the NC positioning devices 50.

In the case of the present example, the aircraft structure 30 is assembled as follows.

First of all, a first segment 31 is introduced into the coordinate system 90, and thus into the recording area of transmitters 10, 11, 12, 13. The segment 31 is positioned and aligned in the coordinate system 90 on the basis of the a priori predetermined position of this segment 31 within the aircraft structure 30. A second segment 32 is now likewise introduced into the coordinate system 90, is positioned and is aligned in the coordinate system in absolute terms or relatively with respect to the first segment 31, such that the two segments 31, 32 together ensure the dimensional constancy of that part of the aircraft structure 30 which is formed by these two segments 31, 32. The two segments 31, 32 are then firmly connected to one another.

A third segment 33 is then introduced, and is positioned and aligned relative to the already assembled segments 31, 32 of the aircraft structure. The targets 40 on the already assembled parts can be grouped by the central computation unit 20 to form a new segment, which comprises the two segments 31, 32.

Any discrepancy in dimensional constancy is detected during the assembly of the aircraft structure 30 when it is found during the positioning and alignment of the segment 32 with respect to that part of the aircraft structure 30 which has been assembled from the segments 31, 32 that their positions, in absolute terms or relatively to one another, are outside a predetermined maximum permissible tolerance.

In principle, it is feasible to form the spatially-fixed coordinate system by means of satellite-protected position data. In this case, the respective satellites which are above the horizon for position finding are used as secondary transmitters, in which case, by way of example, a ground station in a known location is used as the main transmitter, in order to correct delay-time errors and/or fuzziness in the satellite-protected position data. In this case, by way of example, the targets may comprise DGPS (Differential GPS) receivers which are arranged so that they are fixed to the segments for the time period of assembly of the aircraft structure, and which pass their position data to the central computation unit.

The spatially-fixed coordinate system may likewise, for example, be laser-protected, with a three-dimensional network of coordinates being formed locally, for example, by transmission of laser beams or by laser beam fans from the transmitters in the spatially-fixed coordinate system, within which network the positions of the measurement points, for example, can be determined. It is likewise feasible to carry out delay-time measurements on laser beams reflected on the surface of the individual segments. By way of example, the bearings of the measurement points are found for this purpose by laser beams from a plurality of transmitters and, for example, the diffuse backward radiation is detected, in which case the delay times of the individual laser beams can be calculated by suitable modulation of the laser light.

Although the present invention has been described above with reference to preferred exemplary embodiments, it is not restricted to them but can be modified in many ways.

Although the present invention has been explained with reference to an aircraft structure, it is not restricted to use for the production of aircraft structures. For example, it is feasible for the method according to the invention to be used for the production in particular of large-format lightweight structures in other technical fields, in which there is likewise a requirement for very good dimensional constancy, for example for the production of carrier systems for space flight or at sea.

LIST OF REFERENCE SYMBOLS

10 Main transmitter
11, 12, 13 Secondary transmitters
20 Central computation unit
30 Aircraft structure
31, 32, 33 Segment
40 Target
50 Numerically controlled positioning device
51 Adjustable construction apparatus
90 Spatially-fixed coordinate system

What is claimed is:

1. A method for ensuring the dimensional constancy of multisegment physical structures, in particular aircraft structures, during assembly, comprising the following steps:

setting up a spatially-fixed three-dimensional coordinate system which encloses the subsequent assembled physical structure, the spatially-fixed coordinate system being formed by a main transmitter and a plurality of secondary transmitters;

introducing a plurality of segments of the physical structure to be assembled into the spatially-fixed three-dimensional coordinate system;

recording the positions of the individual segments and of already assembled groups of segments repeatedly within the spatially-fixed three-dimensional coordinate system during assembly by the main transmitter and the secondary transmitters, wherein the positions of the secondary transmitters are monitored by the main transmitter, and the position of a respective segment or group of segments recorded by the secondary transmitters are corrected in the event of any discrepancy from preset nominal values of the positions of the secondary transmitters; and correcting the position of a respective segment or of a respective already assembled group of segments if a respective record shows that the positions of the respective segment or of the respective already assembled group of segments is outside a tolerance band, which is predetermined in accordance with a desired dimensional constancy, by a respective predetermined nominal value.

2. The method according to claim 1, wherein, in order to record the positions, measurement points are arranged fixed to the individual segments, their positions are recorded, and the positions are corrected by correction of the positions of the measurement points.

3. The method according to claim 1, wherein the positions of the main transmitter and of the secondary transmitters are recorded without contact being made.

4. The method according to claim 1, wherein the positions of auxiliary tools are monitored with the positions of the auxiliary tools being monitored continuously within the spatially-fixed coordinate system.

5. The method according to claim 1, wherein the spatially-fixed coordinate system is formed by satellite-protected position data.

6. The method according to claim 1, wherein the spatially-fixed coordinate system is formed by laser-assisted position data.

7. The method according to claim 1, wherein the relative position of the segments with respect to one another is recorded in the spatially-fixed coordinate system.

8. The method according to claim 1, wherein the absolute position of the segments within the spatially-fixed coordinate system is recorded in the spatially-fixed coordinate system.

9. The method according to claim 1, wherein the external contour of the segments or segment groups is recorded in order to record the positions.

10. An apparatus for ensuring the dimensional constancy of multisegment physical structures, in particular aircraft structures, during assembly, the apparatus comprising:
   a device for setting up a spatially-fixed three-dimensional coordinate system which encloses the subsequent assembled physical structure, the device comprising a main transmitter and a plurality of secondary transmitters, the main transmitter and the secondary transmitters being configured to record the positions of individual segments and of already assembled groups of segments within the spatially-fixed three-dimensional coordinate system during assembly;
   a device for introduction of a plurality of segments of the physical structure to be assembled into the spatially-fixed three-dimensional coordinate system; and
   a device for correction of the position of a respective segment or of a respective already assembled group of segments in response to an output from the main transmitter and the secondary transmitters that the positions of the respective segment or of the respective already assembled group of segments is outside a tolerance band, which is predetermined in accordance with a desired dimensional constancy, by a respective predetermined nominal value;
   wherein the main transmitter monitors the positions of the secondary transmitters and the position of a respective segment or group of segments recorded by the secondary transmitters is corrected in the event of any discrepancy from present nominal values of the positions of the secondary transmitters.

* * * * *